Figure 1:
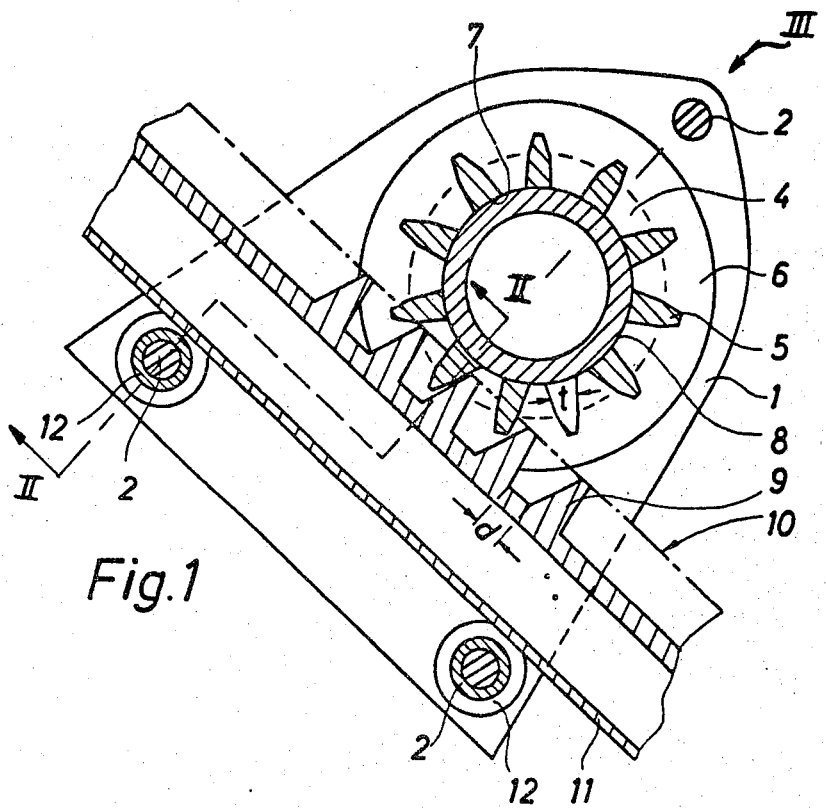

United States Patent [19]

Jensen

[11] 4,402,165
[45] Sep. 6, 1983

[54] RACK AND THE USE THEREOF IN AN OPENING AND CLOSING DEVICE FOR ROOF HATCHES AND SKYLIGHTS

[75] Inventor: Niels T. Jensen, Brøndby Strand, Denmark

[73] Assignee: Dansk Gartneri-Teknik A/S, Brondby Strand, Denmark

[21] Appl. No.: 237,724

[22] Filed: Feb. 24, 1981

[51] Int. Cl.³ .......................... A01G 9/14; F16H 1/00; E04B 1/343

[52] U.S. Cl. ......................................... 52/72; 74/422; 52/729; 52/730

[58] Field of Search .......................... 254/95, 110, 111; 74/422; 52/738, 71, 72, 64, 729–732; 47/17

[56] References Cited

U.S. PATENT DOCUMENTS

| 426,558 | 4/1890 | Dithridge | 52/729 |
| 1,481,822 | 1/1924 | Bengel | 254/110 |
| 1,726,621 | 9/1929 | Hart | 74/422 |
| 1,853,155 | 4/1932 | Van Dyken | 254/95 |
| 2,487,553 | 11/1949 | Hunz | 74/422 |

FOREIGN PATENT DOCUMENTS

| 143278 | of 0000 | Austria . |
| 302854 | of 0000 | Fed. Rep. of Germany . |
| 742840 | of 0000 | Fed. Rep. of Germany . |
| 753987 | of 0000 | France . |
| 492728 | 3/1919 | France . |
| 140965 | of 0000 | Sweden . |
| 194323 | of 0000 | Sweden . |
| 1088156 | 10/1967 | United Kingdom . |

Primary Examiner—James L. Ridgill, Jr.
Attorney, Agent, or Firm—Cushman, Darby & Cushman

[57] ABSTRACT

The opening and closing device permits simultaneous opening of for instance 100 m long roof hatches. Gear wheels are permanently mounted in housings on a transverse driving shaft at regular intervals. The gear wheels drive their respective rack for simultaneous displacement of the entire window. The cogs of the gear wheel have a larger width and are thin compared to the corresponding measurements of the rack cogs. In order to ensure the gear wheel mesh the rack comprises supporting surfaces engaging the cylindrical surfaces of the gear wheel and support rolls. This device ensures that the racks hinged to the window frames may be displaced along or turned about their engaging points with the gear wheel without disengaging said gear wheel, and in such a manner that squeezing is avoided in connection with the longitudinal stretching and shrinking of the shaft due to variations of the temperature.

9 Claims, 6 Drawing Figures

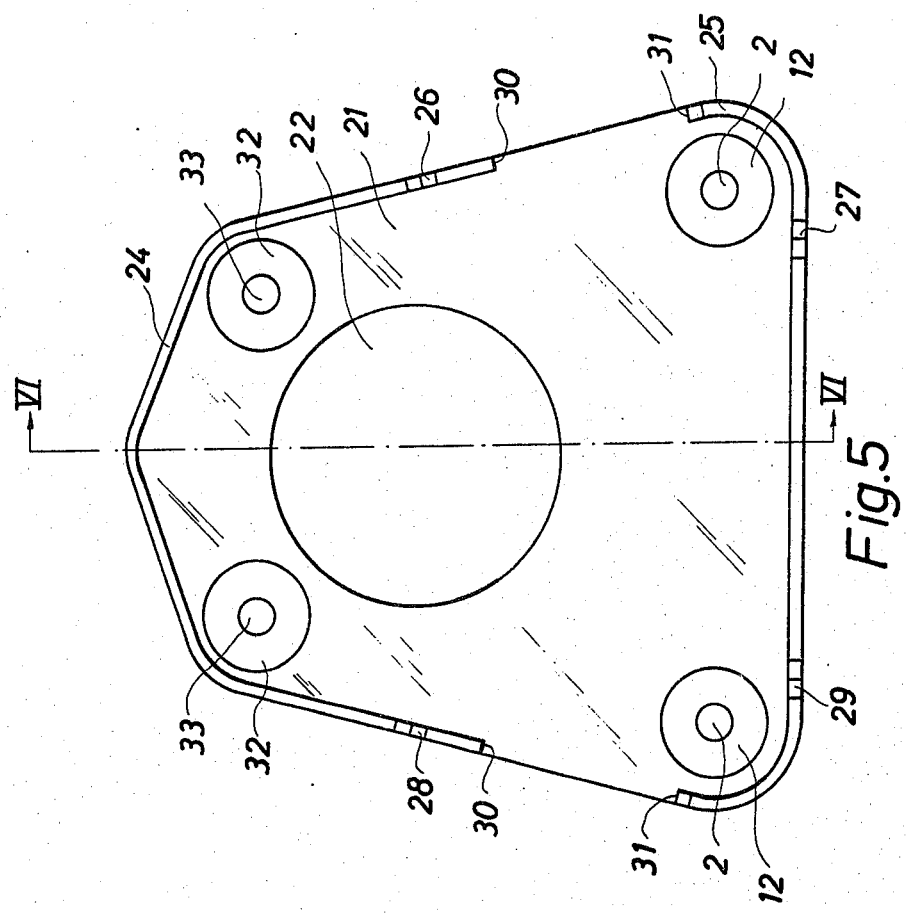
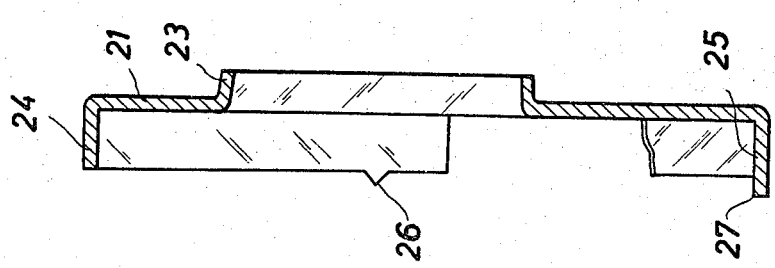

RACK AND THE USE THEREOF IN AN OPENING AND CLOSING DEVICE FOR ROOF HATCHES AND SKYLIGHTS

The invention relates to a rack and the use thereof in an opening and closing device for long rows of skylights or roof hatches, e.g. continuous or sectional hothouse windows, which at the same time are to be equally adjusted substantially in the entire length of the roof, and which device comprises a driven driving shaft mounted in bearings e.g. on the rafters under the lower frame rim of the windows and substantially extending in the entire length of the roof, a plurality of pinions located at regular intervals and comprising their respective cog housing, in which a gear wheel is pivotably mounted relative to the housing and comprises circumferential side flanges, said gear wheel being permanently connected to the driving shaft so as to rotate along therewith, and with two support rolls located at regular intervals in the housing and comprising guide flanges as well as a rack for each pinion, said rack comprising longitudinal ribs and cogs and being hinged to the window frame and located so as to be displaced in the longitudinal direction of the rack and furthermore so as to be between the guide flanges and the side flanges relative to the housing and engaging the cogs.

Danish patent specification No. 110,116 discloses such a simple rack device. This known rack is shaped like a solid bar with a cruciform cross-section, whereby the part of the cross-section forming one leg of the cross is a longitudinal flange, in which the cogs are cut, whereas the two flushing legs perpendicular to this leg form the contact surfaces.

In hothouses of a length of for instance 50–100 m or more the driving shaft being 100 m long or more, however, presents the problem that due to variations of the temperature it stretches and shrinks in practice up to about 6 cm. This implies that when the driving motor is located at one end wall, the gear wheel and the housing secured adjacent the opposite end wall move 6 cm and thereby twist the rack mounted in the housing and hinged to a point on the frame of the window which when the window is closed is about 15 cm from the intermeshing of the rack with the gear wheel. By centering the location of the motor the total move may be reduced to 3 cm, i.e. about 1.5 cm to both sides. As a result the outer racks must be capable of withstanding a transverse twisting of 1.5 cm per 15 cm as they otherwise bend outwards and become locked, which may imply that other racks are bent and locked too and consequently unable of fulfilling their function.

This problem may be overcome by securing the gear wheel displaceably in grooves, which, however, requires a solid steel shaft having milled grooves, said material being exorbitant expensive relative to the generally used hollow driving shaft. This solution is furthermore not advantageous due to the frequent spraying in the hothouse with various substances, since such a shaft corrodes quickly especially in a hothouse atmosphere.

The object of the present invention is to provide a rack which is very strong and rigid relative to its weight and to the consumption of material, whereby it can withstand unusually high bending influences.

A further object of the invention is to provide an opening and closing device for long rows of skylights and roof hatches, which may be subjected to high wind influences and forces deriving from heat expansions of the driving shaft, and which is shaped in such a manner that the counterbalancing of the longitudinal deformation of the driving shaft is performed on the engaging points of the cogs of the rack and the gear wheels, respectively, without risking twisting especially of the racks and squeezing of the individual parts of the device.

This object is achieved by the subject matter of claim 1, as the four substantially T-shaped areas, in which the ribs abut the body, possess a partial power corresponding to a T-beam. The rack according to the invention is especially suited for use in connection with long series of for instance large hothouse windows, whereby the wind influences and other influences deriving from the opening and closing device involve a tendency to twist the rack. The rack may simultaneously be produced with a low consumption of material relative to its strength, e.g. by extrusion, and it is therefore inexpensive to produce.

The subject matter of claim 2 provides a particularly strong embodiment of the rack, whereas the subject matter of claim 3 renders it possible to guide the rack in connection with a gear wheel with side flanges. The subject matter of claim 4 makes the rack suited for particular purposes, whereby cogs being relatively small compared to the strength of the rack are desired. The subject matter of claim 5 ensures that the rack may be obliquely positioned relative to the symmetry plane of the gear wheel co-operating therewith without thereby implying that the sharp edges of the cogs of the rack cut out into the cogs of the gear wheel.

The further object of the invention is achieved by the subject matter of claim 6, as the gear wheel in connection with the heat extension of the driving shaft may move at essentially right angles to the longitudinal direction of the rack without thereby implying that the rack cogs are squeezed between the gear wheel cogs. At the same time the rolling engagement of the cylindrical surfaces of the side and guide flanges and the support path of the ribs, respectively, ensures that the engagement of the rack cogs and the gear wheel cogs is maintained. Furthermore it is ensured that the rack beyond being parallel displaceable relative to the gear wheel also may swing relative to the gear wheel, whereby larger longitudinal displacements of the gear wheel may be counterbalanced.

The subject matter of claim 8 ensures that the elliptical body between the cylindrical surfaces may be displaced forwards and backwards within the interval thereby formed without thereby involving squeezing of the curved portion.

The subject matter of claim 9 ensures in a simple manner that the cogs of the gear wheel being relatively small compared to the intervals of the rack cogs are permanently engaging the rack cogs. This also applies when the entire device is subjected to high wind influences, especially when the parts due to the heat extension of the rack are turned into the outermost position relative to each other. In this manner this measure co-operates in stabilizing the mesh, whereby the device according to the invention is reliable in use. The bending force on the driving shaft is also relieved thereby.

Figure 2:
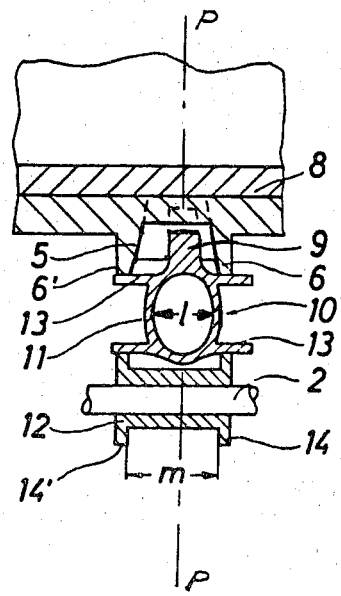
Figure 3:
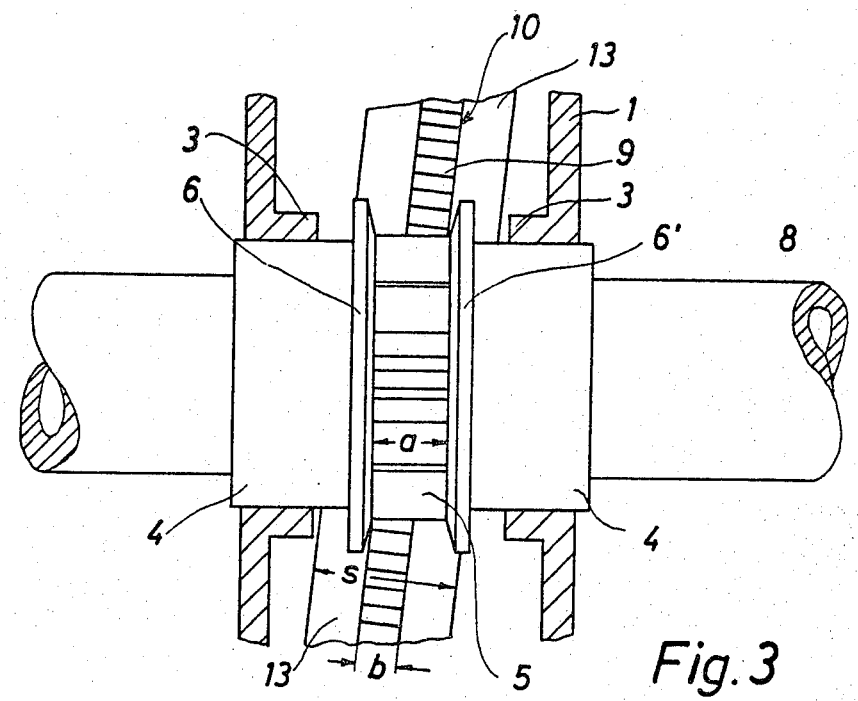
Figure 4:
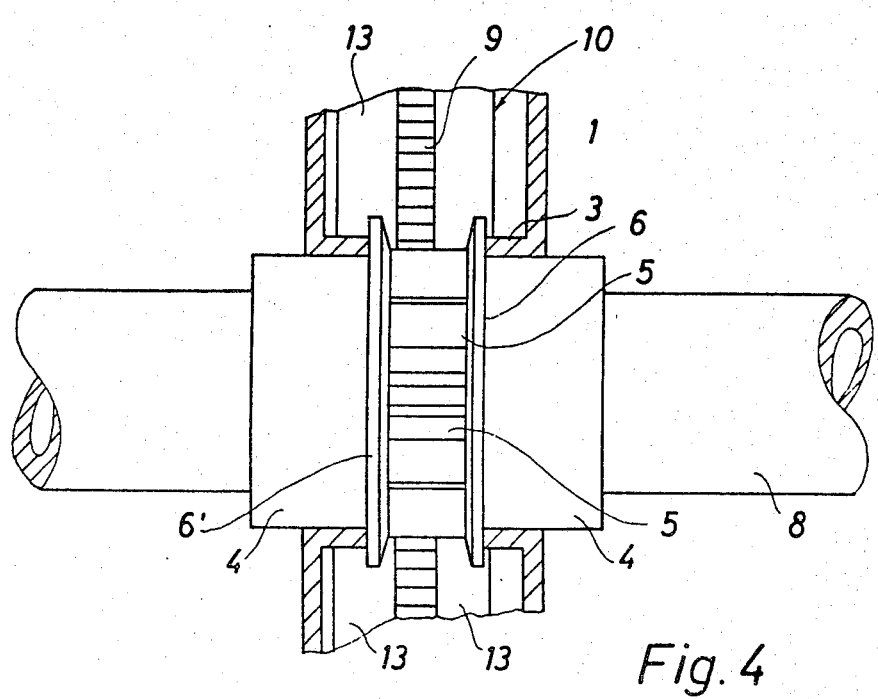

The invention will be described below with reference to the accompanying drawing, in which FIG. 1 is a side elevational view of the device according to the invention, partly in section, FIG. 2 is a sectional view taken along the line II—II of FIG. 1, FIGS. 3 and 4 illustrate the device in the direction indicated by the arrow III in FIG. 1, partly in section, and FIGS. 5 and 6 are sectional plan views taken along the line VI—VI of an embodiment of a plate for producing a housing for the device.

The device according to the invention comprises a housing which is formed by two triangular plates 1 fixedly located with a mutual distance by means of three pivots 2. Each plate 1 comprises an opening with a hub member 3, in which two cylindrical tubular portions 4 are mounted. These two cylindrical tubular portions 4 carry a gear wheel therebetween, which is formed integral with the portions 4. The cogs of this gear wheel are indicated at 5 and extend between two side flanges 6 with cylindrical surfaces 6'. The cog intervals have no bottom, cf. FIG. 1, as the bore 7 in the gear wheel extends to the very circle representing the dedenda.

A plurality of gear wheels formed by the portions 4, the side flanges 6, and the cogs 5 are mounted on a tube at regular intervals. This tube forms a driving shaft 8 located under the rafters of a roof known per se and therefore not shown and extending in the longitudinal direction thereof and furthermore driven by a motor known per se and therefore not shown and preferably located at the middle of the length of the roof and therebelow.

The cogs 5 engage the cogs 9 on a rack 10, which comprises an elliptical web or body 11, cf. FIG. 2. The rack 10 is produced by extrusion or forming of an appropriate plastics or alloy, e.g. a tempered aluminium alloy. By the extrusion a crest is formed extending in the direction of and beyond the major axis of the ellipse, and in which the cogs 9 later on are cut out through mechanical treatment, whereas the rack may also be formed in the working process.

By the extrusion or the forming, an upper and a lower pair of ribs 13 are simultaneously produced, said pairs of ribs projecting to their respective sides parallel to the minor axis 1 of the ellipse. The upper pair of ribs form supporting and rolling surfaces for the cylindrical surfaces 6' of the two side flanges 6. The lower pair of ribs form roller surfaces for cylindrical surfaces 14' on the guide flanges 14 of the support rolls 12 mounted on the pivots 2.

The rack is safely guided by means of the above members, and the cogs 9 thereof thus cannot disengage the cogs 5 of the gear wheel even if the rack 10 should be parallelly displaced relative to the gear wheel or turn slightly about its engagement point with the gear wheel.

The ribs 13 increase essentially the rigidity of the profile both at bending about the major axis of the ellipse and about the minor axis thereof.

A driving shaft in a hothouse may be approximately 100 m long and its length may vary about 6 to 10 cm due to variations of the temperature. By locating the driving motor in the middle, the longitudinal variation may at both ends of the hothouse be reduced to 3 to 5 cm. The distance from the gear mesh to the window frame known per se and consequently not shown is no less than about 15 cm, whereby the tangens of the angle of swinging is 3/15, which corresponds to an angle of about 12°. In other words the rack must be capable of swinging about 6°–8° from the middle position without being subjected to a bending moment. Such a position appears from FIG. 3. In order to obtain this feature each rack 10 is according to one embodiment hinged to the window frame in an eye in a generally known and consequently not in further details explained manner, whereby it may swing up and down and to the sides freely. The distance a between the side flanges 6 of the gear wheel corresponding to the width of the gear wheel cogs 5, the width b of the rack cogs 9, the distance d between the rack cogs 9, the thickness t of the gear wheel cogs 5, the side extension s of the ribs 13 of the rack, as well as the interval m between the guide flanges 14 of the support rolls 12 and the thereby formed recess are mutually adapted in such a manner that the rack may be parallelly displaced relative to the gear wheel and swing or turn about the mutual engaging point of the cogs 5 and 9, cf. FIG. 3. At no time the four cylindrical surfaces 6' of the support rolls 12 and the two cylindrical surfaces 14' of the gear wheel disengage the support paths formed by the four ribs 13. The latter feature ensures that the rack is never twisted about its longitudinal axis, and that its cogs 5 are always maintained efficiently engaging the gear wheel cogs 9. As the gear wheel is permanently connected to the driving shaft, while the housing 1 is pivotably mounted relative thereto and is displaced at the heat extension and shrinking, respectively, of the driving shaft, the rack 10 must be capable of swinging at least about 12° from one outermost position to the other in such a manner that it counterbalances completely the longitudinal deformations of the driving shaft 8, said deformations deriving from variations of the temperature.

In order to reduce the wear and attrition of the cog surfaces it is preferred to round the cog surfaces of the rack in a direction perpendicular to the longitudinal direction of the rack.

In another embodiment the rack 10 is hinged to a bar located on the window frame parallel to the driving shaft 8 so as to permit displacement to the sides and a free up and downward swinging, said hinging being performed in a manner known per se and therefore not described in details. The mesh permitting a displacement to the sides at the window frame may be so loose, that the rack may also swing sideways about this point. In the embodiment of the rack device illustrated in FIG. 4, the side flanges 6 of the gear wheel push the rack to one side or the other by pressing the side surfaces of the cogs 9 when the side flanges of the gear wheel together with the shaft 8 are displaced due to the heat extension of said shaft, cf. also FIG. 2. It is obvious that the displacement of the rack may be a combination of the swinging movement and the displacement to the sides.

FIGS. 5 and 6 illustrate another pentagonal embodiment of the plates 21 of the housing, only one plate appearing. The plate 21 comprises a central aperture 22 with a circumferential flange forming the pivot 23 and in the assembled position of the device being directed from the middle plane of the complete housing. The plate 21 furthermore comprises an upper and a lower flange 24 and 25, respectively, facing the middle plane and possessing projections 26, 27 and recesses 28, 29. These recesses are located so as to guide the plates 21 during the assembling. When the housing is assembled, an aperture is formed between the end rims 30, 31 of the flanges 24, 25, the rack 10 extending through said aperture. Beyond gear wheels 4, 5, 6 and the support rolls 12, two guide rolls 32 are furthermore located on pivots 33 between the above plates 21 in the assembled position. When the device is assembled, these rolls 33 roll against the cylindrical surfaces 6' of the gear wheel and thereby ensure the mesh of the cogs of the gear wheel with the cogs of the rack as well as counteract high influences therebetween. This feature furthermore ensures that the driving shaft is not subjected to a load perpendicular thereto.

I claim:

1. A cogged rack having a body shaped substantially like an I-beam, the body comprising two longitudinal ribs projecting to both sides and extending in parallel planes and a toothed crest characterized in that the body is hollow and oval in transverse cross section, that the body has a projecting portion projecting above the plane of each pair of ribs, that the toothed crest is formed integral with said projecting portion and is perpendicular to said planes, and that the cogs of the rack are formed in said toothed crest.

2. A rack as claimed in claim 1, characterized in that the hollow body is elliptical in transverse cross section, and that the toothed crest is located in extension of the major axis of the ellipse, whereas the planes of the four ribs extend parallel to the minor axis and in the longitudinal direction of the rack.

3. A rack as claimed in claim 2, characterized in that the planes of the ribs are mutually spaced, said mutual distance being slightly shorter than the length of the major axis, that the planes are preferably substantially equally spaced from the centre of the ellipse, and that the ribs are located in such a manner that the ogival ends of the body project beyond the plane of each pair of ribs substantially at a distance corresponding to or being slightly larger than the material thickness of the body.

4. A rack as claimed in claim 1, characterized in that the toothed crest and its cogs are narrower than the oval body of the rack.

5. An opening and closing device for long rows of skylights or roof hatches, e.g. continuous or sectional hothouse windows, which at the same time are to be equally adjusted substantially in the entire length of the roof, and which device comprises a driven driving shaft mounted in bearings e.g. on the rafters under the lower frame rim of the windows and substantially extending in the entire length of the roof, a plurality of pinions located at regular intervals and comprising their respective cog housing, in which a gear wheel is pivotably mounted relative to the housing and comprises circumferential side flanges, said gear wheel being permanently connected to the driving shaft so as to rotate along therewith, and with two support rolls located at regular intervals in the housing and comprising guide flanges, said device further comprising a rack for each pinion, said rack comprising longitudinal ribs and cogs and being hinged to the window frame and located so as to be displaced in the longitudinal direction of the rack and furthermore so as to be between the guide flanges and the side flanges relative to the housing and engaging the cogs, characterized in that the rack is shaped as claimed in claim 1, that the width (b) of the rack cogs is smaller than the width (a) of the wheel cogs, that the planes of the ribs are parallel to the axes of the driving shaft and the rack, respectively, and that the ribs extend so far beyond the body of the rack that irrespective of a displacement of the shaft causing displacement or turning of the rack relative to the union with the cogs inside the side flanges, the ribs will remain in contact with all six flange on the gear wheel and the support rolls and still constitute a a contact surface for the cylindrical surface of the flanges.

6. A device is claimed in claim 5, characterized in that the cogs of the wheel in the circumferential direction have a thickness (t) smaller than the corresponding interval (d) between the cogs of the rack, whereby said thickness and said interval are adapted to each other in such a manner that an efficient driving connection is maintained between the cogs.

7. A device as claimed in claim 5, characterized in that the support rolls between the cylindrical surfaces comprise a circumferential recess of such a size (m) and shape that the curved portion of the rack (10) between the cylindrical surfaces may be displaced in this recess in such a manner that the cylindrical surfaces still engage the corresponding support surfaces without involving squeezing of the curved portion.

8. A device as claimed in claim 5, characterized in that supporting guide rolls abut and roll on the guide surfaces of the wheels at locations placed on a line at the opposite side of the centre of the gear wheel.

9. A cogged rack comprising an elongated body of substantially I-beam shape, said body having a hollow web portion which in transverse cross section is oval both internally and externally and two longitudinal solid flange portions lying in substantially parallel planes which are parallel to the smaller dimension of the oval shape of the body portion, each flange portion being formed by a pair of ribs projecting laterally beyond each side of the web portion; and a longitudinal, rib-shaped, solid crest projecting outwardly from one of said flange portions along the longitudinal center thereof in a plane perpendicular thereto, the crest having a longitudinal outer edge in which the cogs of the rack are formed.

* * * * *